United States Patent

Fields

[15] 3,635,631
[45] Jan. 18, 1972

[54] CONTINUOUS MOLDING OF THERMOPLASTIC RESIN

[72] Inventor: Reuben Thomas Fields, Wilmington, Del.
[73] Assignee: E. I. du Pont de Nemours and Company, Wilmington, Del.
[22] Filed: June 10, 1970
[21] Appl. No.: 45,166

[52] U.S. Cl.............................425/223, 264/216, 425/224, 425/324
[51] Int. Cl...........................................................B29d 7/10
[58] Field of Search..........................18/4 B, 5 A, 9, 10, 15; 264/167, 216, 322

[56] References Cited

UNITED STATES PATENTS

| 2,052,695 | 9/1936 | Chiverton | 18/15 F X |
| 2,624,914 | 1/1953 | Rhodes | 264/216 X |
| 2,678,493 | 5/1954 | Edmunds, Jr. | 18/15 S X |
| 3,505,157 | 4/1970 | Fields et al. | 264/167 X |

FOREIGN PATENTS OR APPLICATIONS

| 410,168 | 5/1934 | Great Britain | 18/15 F |
| 579,245 | 7/1958 | Italy | 18/15 F |

Primary Examiner—Robert L. Spicer, Jr.
Attorney—Martin R. Levy

[57] ABSTRACT

Molten thermoplastic resin, e.g., polyethylene is forced into a pattern on the surface of a rotating roll to form a web of the resin, the resin being forced into the pattern through a die having a zigzag upstream edge.

8 Claims, 5 Drawing Figures

PATENTED JAN 18 1972 3,635,631
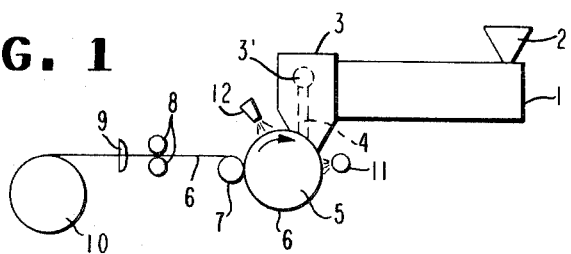
FIG. 1
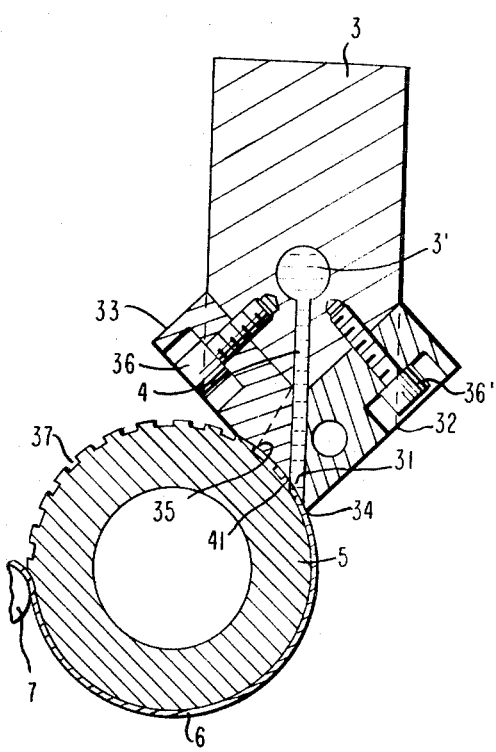
FIG. 2
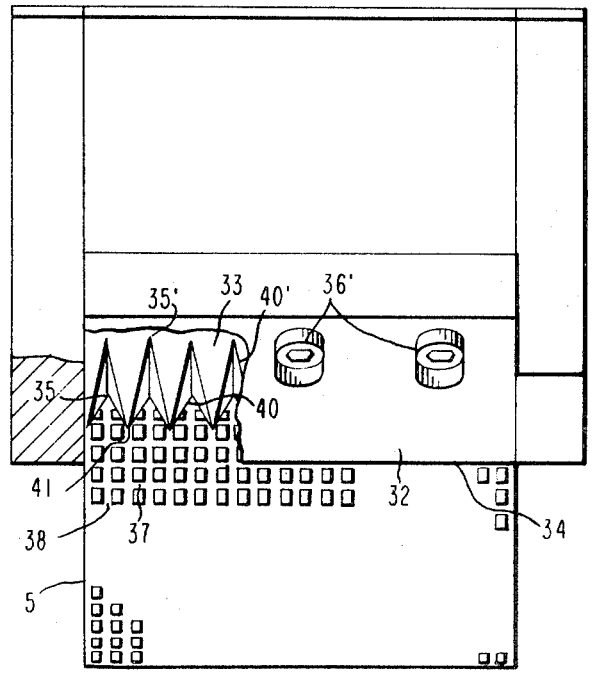
FIG. 3
FIG. 4B
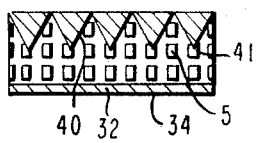
FIG. 4A
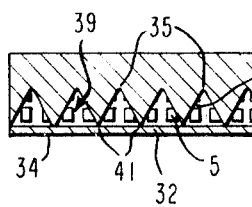
INVENTOR
REUBEN T. FIELDS
Martin B Levy
ATTORNEY

CONTINUOUS MOLDING OF THERMOPLASTIC RESIN

This invention relates to the continuous molding of molten thermoplastic resin into a web as described in U.S. application Ser. No. 619,994, now U.S. Pat. No. 3,515,778, filed Mar. 2, 1967.

In the process there discussed, pressurized molten thermoplastic resin is passed, substantially free of pressure drop, along a laterally confined path which terminates at an outlet which is in pressure-seal relation with a relatively cool patterned solid surface moving across the outlet, whereby the molten resin is forced into the pattern of the surface to continuously mold a patterned web which is removed from the surface at a point remote from said outlet. Apparatus for carrying out this process is also discussed in U.S. application Ser. No. 619,994 filed Mar. 2, 1967 and includes structure such as a patterned roll defining the moving patterned solid surface, a source of pressurized molten thermoplastic resin, die means communicating between the source and the surface and having its outlet in pressure-seal relation with the latter for receiving resin from the source and directing the resin through its outlet without any substantial loss of pressure against the patterned surface, thus the pressure upon the resin forces it into the pattern of the surface to continuously mold a patterned web of resin which is then transported away from the die means by the movement of the surface, and means for cooling the surface so as to chill the resin coming into contact therewith.

The pressure upon the molten resin within the die means is present at the interface between the outlet of the die means and the patterned surface and is available for a sufficient duration to cause even intricate patterns to be filled at high speeds of movement of the surface. Surprisingly, these results are not precluded by the chilling of the molten thermoplastic resin coming into contact with the patterned surface. Further surprising is the fact that thin films on the order of 0.001 to 0.005-inch inch thick, can be molded despite chilling of the molten resin in contact with the patterned surface.

In another embodiment of that apparatus, the same pressure-seal relation between the outlet of the die means and patterned surface is maintained, except that the outlet includes a wedge-shaped passage extending in the direction of movement of the patterned surface and having its base formed by the moving patterned surface. This wedge-shaped passage receives molten resin by drag flow of the resin across the path of the resin within the die means by the patterned surface, and, in turn, forces the received resin into the pattern of the surface. This drag flow augments the pressure exerted upon the resin in passing along the laterally confined path. For simple patterns, drag flow pressure alone is sufficient to obtain pattern filling provided that sufficient molten resin is supplied to the wedge-shaped passage. The wedge-shaped passage also has the effect of increasing the area and time of contact between molten thermoplastic resin and the relatively cool patterned surface during molding, an effect which would be expected to increase molding difficulty. Surprisingly, however, this embodiment, because of the pressure created in the wedge-shaped passage, enables more intricate patterns and even higher production speeds to be attained than with the first described apparatus embodiment.

It has been found, however, that when filling screen-type patterns in the patterned roll having intersecting grooves such as substantially circumferential and axial grooves, that the grooves in the circumferential configuration fill preferentially. Voids may thus form in the resin filling the axial set of grooves.

The present invention provides an improvement over the apparatus described in U.S. application Ser. No. 619,994 filed Mar. 2, 1967.

This invention is an apparatus for continuously molding thermoplastic resin, comprising structure defining a surface having a pattern therein and die means having a passage terminating in an outlet positioned in pressure-seal relation with said moving surface for directing molten thermoplastic resin through said outlet into said pattern, said outlet defined by a downstream surface terminating in a doctor blade and an upstream surface terminating in a zigzag edge having interior and exterior reversals, the interior reversals having an included angle of between 20° and 120° whereby said molten thermoplastic resin is forced into said pattern to obtain a continuous web of said molten thermoplastic resin, means for cooling the web and means for removing it from said surface. Preferably, the invention is an apparatus for continuously molding thermoplastic resin, comprising structure defining a moving surface having a pattern therein, and die means having an outlet positioned in pressure-seal relation with said moving surface for directing molten thermoplastic resin through said outlet into said pattern, said pattern having grooves running substantially circumferentially and substantially axially, said die means having a passage terminating in an outlet positioned in pressure-seal relation with said moving surface for directing molten thermoplastic resin through said outlet into said pattern, said outlet defined by a downstream surface terminating in a doctor blade and an upstream surface terminating in a zigzag edge having interior and exterior reversals, the interior reversals having an included angle of between 20° and 120°, the interior reversal coinciding with a substantially circumferential groove in said pattern of said moving surface, with the pattern of said surface forming the base of said passage, whereby molten thermoplastic resin is forced into said pattern to obtain a continuous web of said molten thermoplastic resin, means for cooling the web and means for removing it from said surface. Preferentially the interior reversal has an included angle of between 60° and 90°.

Preferentially, the die orifice has a wedge-shaped passage which terminates in said outlet and the wedge-shaped passage extends in the direction of movement of the patterned surface.

These and other embodiments of the present invention will be more fully described in the following detailed discussion and in the accompanying drawings in which:

FIG. 1 is a diagrammatic representation of a continuous molding line incorporating features of this invention;

FIG. 2 shows, in a side elevation cross section, one embodiment of molding apparatus for use in the molding line of FIG. 1;

FIG. 3 shows, in a front elevation partial section, the inventive feature of the present invention;

FIGS. 4A and 4B show, in cross section, across the mouth of the wedge-shaped passage, the zigzag aperture of the present invention.

Referring now to the drawings, in FIG. 1 is shown an extruder 1 equipped with a hopper 2 for receiving thermoplastic resin. The extruder 1 works the resin and melts it under pressure. A die 3 receives the pressurized molten resin through its rear (hidden) side from the extruder and passes the resin along a path 4 which terminates in an outlet in pressure-seal relation with a rotating patterned roll 5 and directs the resin substantially free of pressure drop and in the absence of air into the pattern of the roll. The roll 5 continuously moves the molten resin away from the outlet of path 4, thereby forming a continuous molded web 6 having a pattern which is complementary to that of the roll. The web 6 is chilled by a flume or water spray 11, and after sufficient contact with the roll 5 which is internally cooled, the cooled web is removed from the roll by takeoff rolls 8 aided by a stripper roll 7 and mold release agent is applied by spray nozzles 12 to the surface of the roll prior to passage under die 3. Longitudinal dividing or trimming of web 6 is accomplished by one or more blades 9 positioned between the takeoff rolls 8 and reel 10.

To further describe the die 3 and patterned roll 5, which comprise the molding apparatus of this invention, FIG. 2 shows one embodiment in which die 3 contains a cavity 3' serving path 4 and which is supplied with molten thermoplastic resin through inlet by extruder 2 as seen in FIG. 1. Cavity 3' terminates in a slot-shaped outlet 31 extending across the surface of roll 5. The rearward and forward edges of outlet 31 are defined by a die plate 33 terminating in a zigzag serrated edge 35, 35' and 40, 41 defined in greater detail hereafter and a die plate 32 terminating in a doctor blade 34, respectively, each adjustably spaced from roll 5 and secured to die 3 by bolts 36 and 36' extending through slots. The pressure upon the molten resin in the cavity 3' forces the resin through outlet 31 and into the roll pattern represented by transverse grooves 37 (enlarged in spacing and width for clarity) and intersecting grooves 38 as in FIG. 3. The cavity 3' and path 4 and outlet 31 are substantially free of constriction so that the pressure on the resin at the surface of roll 5 is substantially the same as the pressure on the resin in cavity 3'.

The grooves 37 (axial) and 38 (circumferential) and protuberences they create mold one surface of the web 6. The opposite surface of the web is formed by doctor blade 34 which is adjustably spaced from roll 5 to give the web thickness desired. Thus, a web consisting of intersecting strands or ribs corresponding to the grooves 37 and 38 can be obtained, with either apertures being present between the strands or a contour film forming one surface of the web. Die 3 may heat to a temperature above the resin melting temperature of the particular resin being used, by electrical heating elements extending into corresponding wells in the die. The resin melting temperature is the minimum temperature at which a fresh sample of resin leaves a molten trail as it is moved slowly across a heated metal surface. This is also sometimes called the stick temperature.

Die plate 32 may be heated by an electrical heating element usually to a temperature which is equal to or greater than the temperature maintained in die 3, thus heating doctor blade 34 to substantially the same temperature. The downstream face of the die plate terminating in the doctor blade departs sharply from the path of web 6 so as to avoid sticking of the web to the hot doctor blade. The doctor blade can also be notched along its lowermost face to yield corresponding projections in the molded web. The upstream surface of die plate 32 may also take the form of a zigzag which matches the zigzag of die plate 33 edge but is spaced therefrom leaving an outlet having the form of a repeating pattern zigzag line. Roll 5 is at a temperature which is at least about 10° C. less than the melting temperature of the resin being molded. It is maintained at such a temperature by cooling means such as means accommodating a cooling medium passing through an interior passage.

The molding apparatus of FIGS. 2 and 3 can be provided with a water spray 11 and mold release spray nozzles 12 as shown in FIG. 1.

A pressure-seal relation between the outlet 31 for the molten thermoplastic resin and roll 5 is maintained so that the pressure on the resin in cavity 3' and the drag flow pressure, is available to force the resin into the pattern of roll 5 on a continuous and high speed of production basis. Generally the resin in cavity 3' is under a pressure of at least 50 p.s.i.g. for resins, such as polyamides. For resins such as polyethylene, the pressure is generally above 175 p.s.i.g. There is a capability, however, of using much higher molding pressures, such as in excess of 1,000 p.s.i.g., depending on the pattern being molded. In some cases, drag flow pressure may be used by itself to attain molding. The pressure-seal relation is obtained, in part, by adjusting the doctor blade 34 to constrict the flow space for the resin as it leaves outlet 31 and by having a sufficient rate of web formation for the viscosity of the particular resin being molded to prevent backflow under the die plate 33 which is generally spaced 2 to 10 mils from the surface of roll 5.

Means can also be provided for allowing the spacing between the die 3 and the roll 5 to change to compensate for pressure fluctuations caused by extruder 1 so as to maintain a constant force on the resin entering the roll pattern as described in U.S. application Ser. No. 619,994, filed Mar. 2, 1967.

In this invention, the width of outlet 31 in the direction of rotation of roll 5 should be greater than at least one repeat unit in the pattern as described in application Ser. No. 619,994 filed Mar. 2, 1967. The opening at the end of the die may be wedge-shaped as in FIGS. 2 and 3 or the die walls at the outlet may be of equal length.

FIG. 3 shows in partial section the serrated edge defined in part by reversals 35, 35' and 41 and edge 40. The serrated edge defines area 39. The outlet 31 through which polymer flows onto roll 5 may be essentially of repetitive triangular sections as in FIG. 4A or the outlet may be essentially an open rectangular slot, in which only the upstream edge of the outlet is defined by exterior reversals 35, 35' and interior reversal 41 and edge 40 as in FIG. 4B.

Serrated upstream edge of die plate 33 and defined reversals may be almost coterminous with upstream edge of die plate 32, doctor blade 34 as in FIG. 4A but need not be so as discussed above and as seen in FIG. 4B.

In one embodiment of this invention, the interior reversals 35 and 35' are spaced so as to correspond to a groove 38 substantially circumferentially aligned in the patterning roll. The number of circumferential grooves per reversal of the zigzag upstream edge may vary from one to 10 or even 20 grooves per reversal depending on the width of the grooves and the number of grooves per axial inch of roll surface. It has been found that the presence of a zigzag pattern in the die plate 33 provides a more uniform filling of the transverse (axial) grooves of the pattern in roll 5 and more uniform cast product under some conditions.

Without being bound thereby, it is believed that when the zigzag edge is positioned as here discussed, it provides for the escape of air from the grooves. It is believed that the circumferential grooves tend to fill preferentially and thus trap air in spaces in the transverse grooves providing resistance to their filling. This difference in resistance to filling could cause nonuniformities in cast product. Providing interior reversal in line with circumferential grooves in the roll is believed to provide preferred paths of escape for this air and thus results are more uniform filling of the transverse (axial) grooves. The contour of the machined zigzag surface should be in line with normally accepted extrusion principles.

When a patterned roll having equally spaced axial and circumferential grooves on ⅛-inch centers and 0.035-inch wide is used, the interior reversal of the zigzag should be in line with the circumferential groove in the patterning roll. On the other hand, when the grooves are closely spaced such as 0.020-inch apart, no particular advantage is found in locating the grooves and interior reversal of the zigzag in any particular relationship.

The angle of the reversals 35 and 35' should be between 20° and 120° and preferably between 60° and 90°. Further, it is preferred that both reversals 35, 35' and 41 be of the same angle. Whereas advantage is gained by the presence of the zigzag edge, when pattern on the roll gets larger, it becomes more desirable for the interior reversal to coincide with a circumferential groove in the patterned rolls.

If normally accepted practices are followed, there are no other limitations necessary for this invention in the contouring of the zigzag edge.

Web produced according to the present invention can also be longitudinally and transversely drawn to the degree desired as described in copending application Ser. No. 619,994 filed Mar. 2, 1967.

The shape of the depressions molded into the web can be varied from the circular form shown to a polygonal form, such as squares, or other forms, by correspondingly altering the mold pattern in roll 5. The strands of the web, whether the web be defilmed, or uniaxially or biaxially oriented have integrally molded intersections. Some of the uses of screening made according to the present invention are as insect barriers, lace and other decorative fabrics, buckram, crinoline, and other nonwoven fabrics.

Reinforcing scrim is another use for screening made according to the present invention. Reinforcing scrim characteristically has high strength in one direction but little strength in the transverse direction. Biaxially oriented screening made with the apparatus of the present invention overcomes this disadvantage by having high strength in both directions. The preferred biaxial draw is at least 2.5 times and preferably at least three times in each direction; high density polyethylene screening is preferably biaxially drawn at least four times the original screening dimension. A particularly useful biaxially drawn scrim has from two to three strands per inch arranged in a square pattern and having a strand cross section of about 0.025 inch on a side. Such a product has a breaking strength of about 30 lbs. per inch of width. To maintain good intersection strength of drawn screening, the intersections should include rounded corners, between strands, before drawing as well as thereafter.

Typical polymers with which this apparatus is useful are described in U.S. application Ser. No. 619,994 filed Mar. 2, 1967.

The particular molding and drawing temperature employed in making and modifying webs such as hereinbefore described will depend on the resin being molded and such operating conditions as the speed of the patterned roll 5 and the intricacy of the pattern therein. The capability of the molding process and apparatus of this invention to mold intricate patterns is intended to refer to a capability of filling patterns having closely spaced grooves and grooves of narrow widths and high depth to width ratios, as well as other intricacies of pattern design. The temperatures will also depend on the nature of the apparatus employed.

In a typical process, an extruder such as described in U.S. Pat. No. 3,325,865 is equipped with a die as described above in pressure-seal relation to a patterned casting roll. The roll is 4 inches in diameter and 6-inches wide. It has a 0.160-inch square pattern of grooves 0.035-inch wide by 0.050-inch deep. The edges formed are rounded to 0.035-inch radius of curvature.

Nylon resin typically at 280° C. in the die is extruded at 25 feet per minute onto the roll which is maintained at about 110° C. The roll moves at a surface speed of about 40 feet per minute. The roll is initially sprayed with stearic acid as a release agent, the cavities filled and thereafter water is used to cool the mold, and the web is removed from the roll as in FIG. 1. The die has a zigzag orifice with both the interior and exterior reversals equal to 90°. When the interior reversals are aligned with the circumferential grooves on the casting roll, improved filling of the transverse and circumferential grooves results over that obtained when the same roll is used with a delivery passage in a slot shape (no zigzag upstream edge).

The same type of process is carried out with a different roll and a different extrusion die.

The roll pattern consists of square pegs 0.020 inch on each side rising 0.030 inch above the groove bottom (the surface of the roll). Each peg is then rounded to a circular cross section of about between 0.020–0.023 inch in diameter. The die is similar to that used above except the zigzag upstream edge of the die outlet has both interior and exterior reversals of 60°.

Satisfactory product is made with interior reversal of the zigzag aligned with circumferential grooves. Satisfactory product is also obtained with the interior reversal of the zigzag edge is aligned with circumferential grooves.

Typical operating temperatures, including heat stabilization temperature for stabilizing oriented web from shrinkage, for some of the thermoplastic resins suitable for use in the present invention are as follows:

| Resin | Molding Temp. °C. | Draw Temp. °C. | Heat Stabilization Temp. °C. |
|---|---|---|---|
| Linear polyethylene[1] | 200–250 | 50–120 | 90 |
| branched polyethylene[2] | 180–190 | 20–60 | — |
| polypropylene | 200–250 | 50–135 | 100 |
| polystyrene | 240–280 | 135 | 90 |
| polyvinyl chloride | 150–170 | 100 | 95 |
| 66 nylon | 260–350 | 125–230 | 170 |

[1] frequently called high density polyethylene
[2] frequently called low density polyethylene In the above examples, the included angle of reversal 35, 35' and 40 is 60°. The depth of groove by the zigzag from reversal 40 to 35, 35' is 0.5 inch. The frequency of reversal is 1⅔ per inch. There were matching grooves in the upstream die plate. The peak to peak distance is not critical but is usually between 0.25–0.75 inch.

Generally, the passage 31 will take the form of converging surfaces, with the roll pattern forming one of these surfaces. The pressures required on molten thermoplastic resin in cavity 3' can be less than the full extrusion pressure of the extruder, depending upon which resin is employed and upon operating conditions. The pressure in the cavity 3', however, is substantially the same as the pressure of the resin as it comes into contact with the pattern of the roll surface. When such pressure is insufficient, a drag flow arrangement can be used to increase the force present for continuously filling the pattern with molten resin. The depth of the grooves forming the pattern in roll 5 need not be uniform. Thus, it is apparent that the process and apparatus of this invention is also useful for molding of articles such as are now injection molded, with the continuous film produced in the present invention resembling the flash obtained in injection molding.

The words "circumferential" and "axial" are used herein because the preferred patterned surface is a patterned roll; however, these words mean direction of motion of the surface and transverse to that direction, respectively. The surface may take the form of a belt carried by rollers or other mechanical device for transporting resin as is known in the art so long as the features above described for carrying out the invention are present.

As many widely different embodiments of this invention may be made without departing from the spirit and scope thereof, it is to be understood that this invention is not limited to the specific embodiments thereof except as defined in the appended claims.

I claim:

1. Apparatus for continuously molding thermoplastic resin, comprising structure defining a moving surface having a pattern therein and die means having a passage terminating in an outlet positioned in pressure-seal relation with said moving surface for directing molten thermoplastic resin through said outlet into said pattern, said outlet defined by a downstream surface terminating in a doctor blade and an upstream surface terminating in a zigzag edge having interior and exterior reversals, the interior reversals having an included angle of between 20° and 120°, whereby said molten thermoplastic resin is forced into said pattern to obtain a continuous web of said molten thermoplastic resin, means for cooling the web and means for removing it from said surface.

2. Apparatus for continuously molding thermoplastic resin, comprising structure defining a moving surface having a pattern therein, and die means having an outlet positioned in pressure-seal relation with said moving surface for directing molten thermoplastic resin through said outlet into said pattern, said surface having at least grooves running substantially circumferentially and transversely therein, said die means having a passage terminating in an outlet positioned in pressure-seal relation with said moving surface for directing molten thermoplastic resin through said outlet into said pattern, said outlet defined by a downstream surface terminating in a doctor blade and an upstream surface terminating in a zigzag edge having interior and exterior reversals, the interior reversals having an included angle of between 20° and 120°, at least some of the interior reversals coinciding with a circumferential groove in said pattern of said moving surface, whereby molten thermoplastic resin is forced into said pattern to obtain a continuous web of said molten thermoplastic resin, means for cooling the web and means for removing it from said surface.

3. The apparatus of claim 1 wherein the interior reversal has an included angle of between 60° and 90°.

4. The apparatus of claim 2 wherein the interior reversal has an included angle of between 60° and 90°.

5. The apparatus of claim 1 wherein the passage is wedge-shaped and extends in the direction of movement of the patterned surface.

6. The apparatus of claim 2 wherein the passage is wedge-shaped and extends in the direction of movement of the patterned surface.

7. The apparatus of claim 5 wherein the surface is a roll.

8. The apparatus of claim 6 wherein the surface is a roll.

* * * * *